April 30, 1940. F. E. WOLCOTT 2,198,645
ELECTRIC COOKING DEVICE
Filed July 10, 1935 7 Sheets-Sheet 1
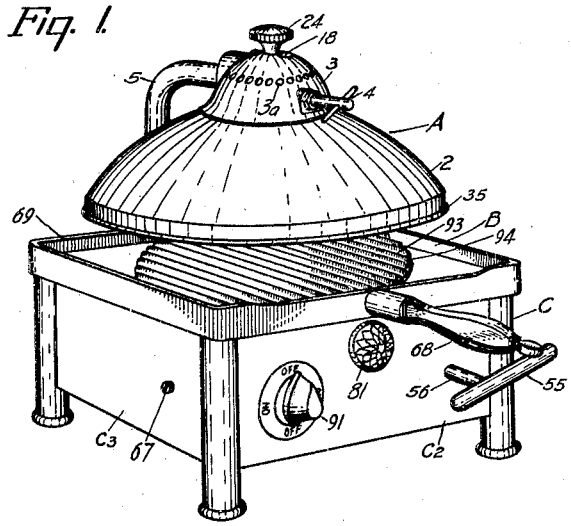
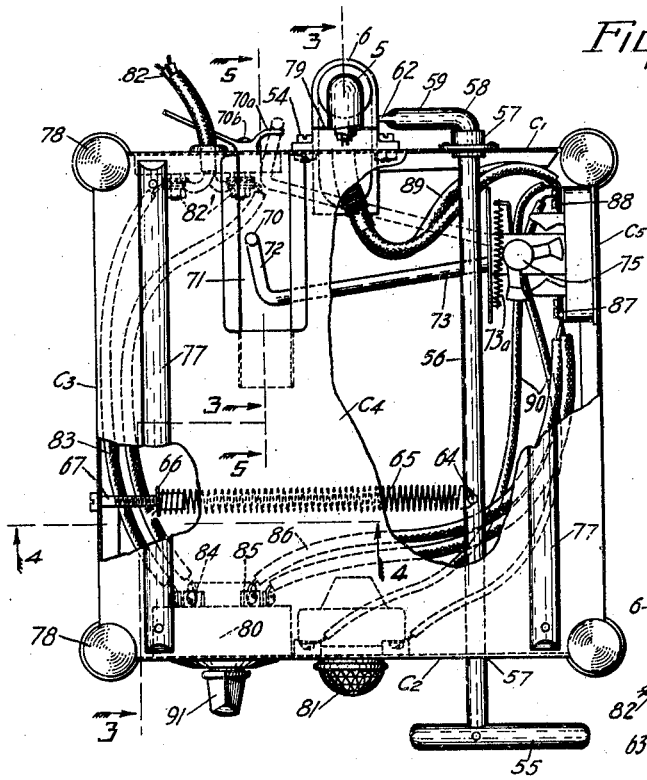
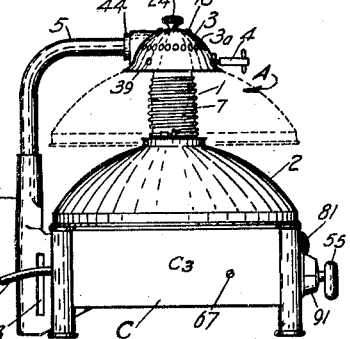
INVENTOR
Frank E. Wolcott
BY
ATTORNEY April 30, 1940.    F. E. WOLCOTT    2,198,645
ELECTRIC COOKING DEVICE
Filed July 10, 1935    7 Sheets-Sheet 2

INVENTOR
Frank E. Wolcott
BY
ATTORNEY

April 30, 1940.                F. E. WOLCOTT                2,198,645
                            ELECTRIC COOKING DEVICE
                            Filed July 10, 1935          7 Sheets-Sheet 3
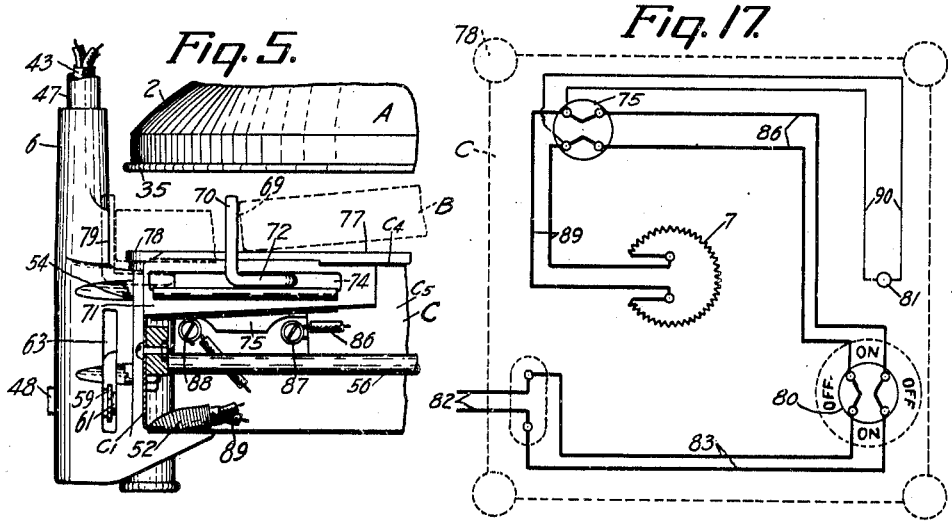
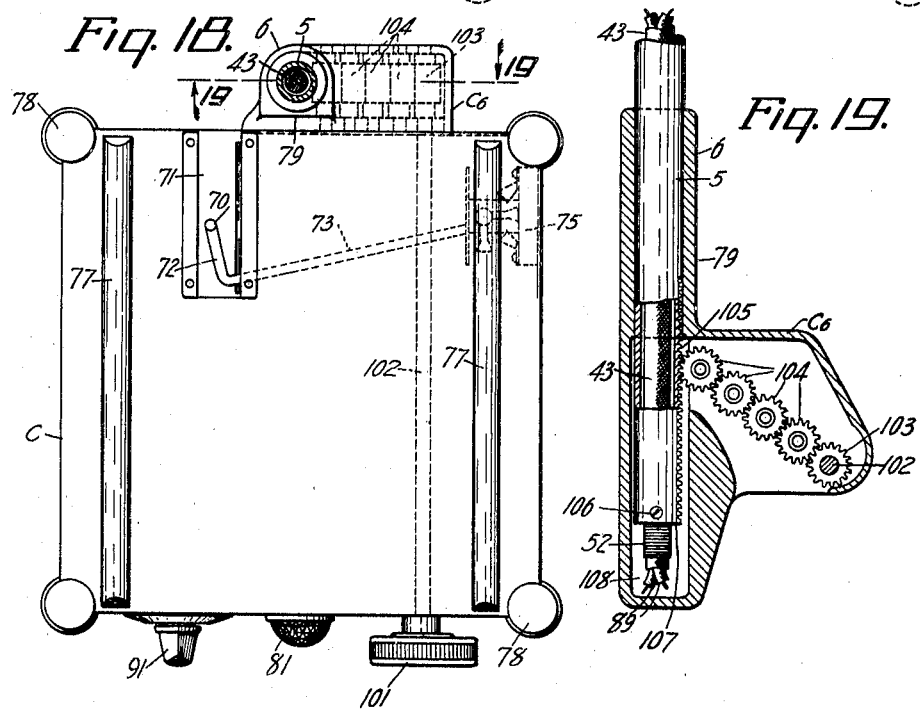
INVENTOR
Frank E. Wolcott
BY
ATTORNEY April 30, 1940.　　　F. E. WOLCOTT　　　2,198,645
ELECTRIC COOKING DEVICE
Filed July 10, 1935　　　7 Sheets-Sheet 4
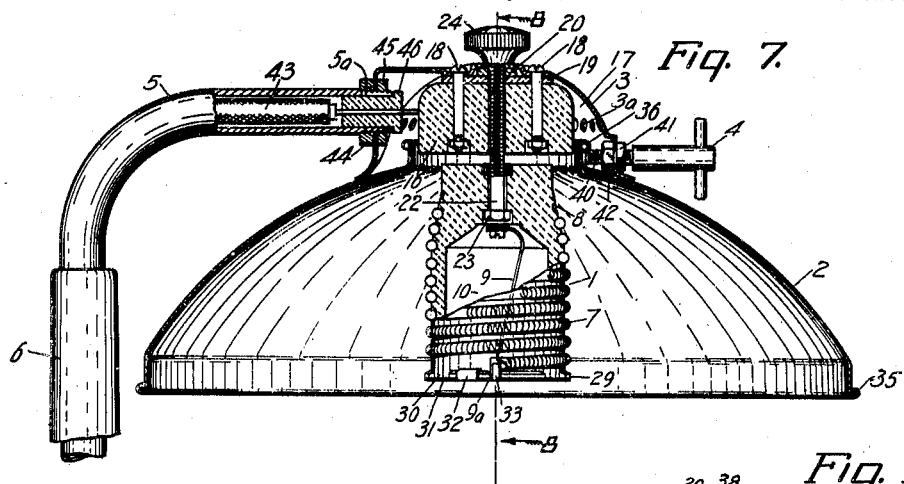
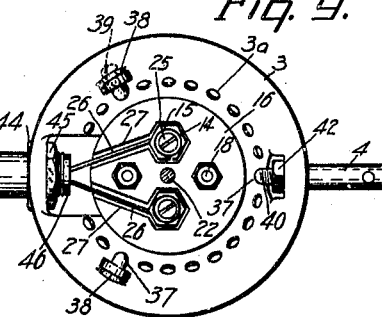
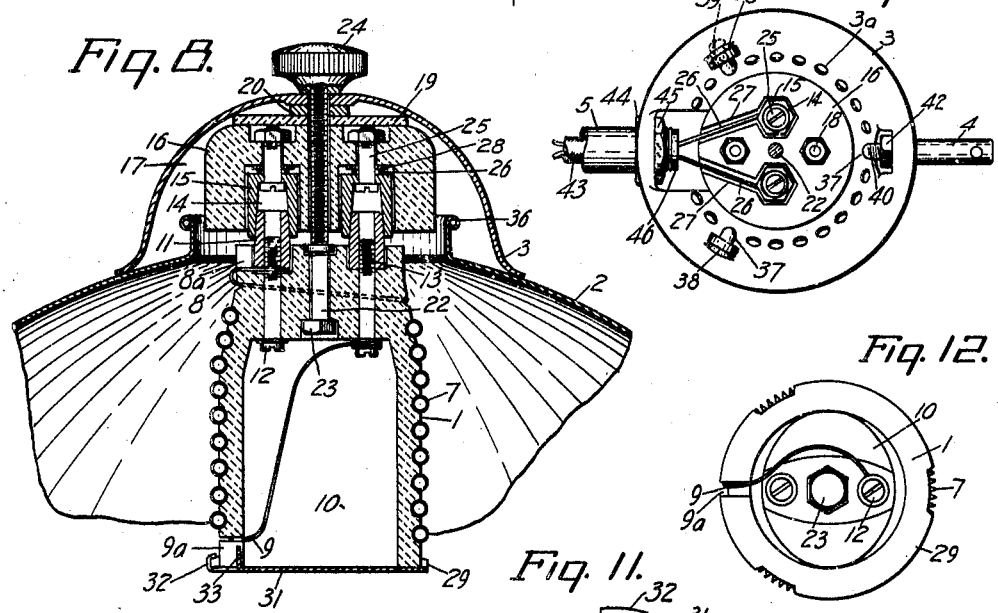
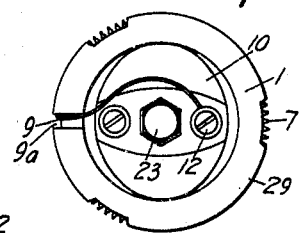
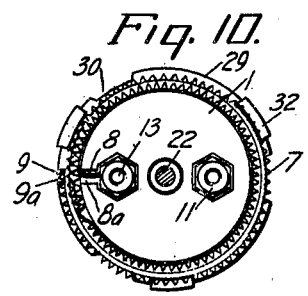
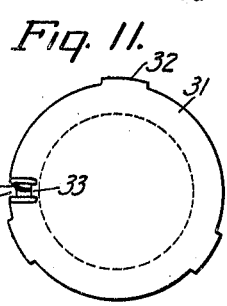
INVENTOR
Frank E. Wolcott
BY
ATTORNEY April 30, 1940.  F. E. WOLCOTT  2,198,645
ELECTRIC COOKING DEVICE
Filed July 10, 1935   7 Sheets-Sheet 5

INVENTOR
Frank E. Wolcott
BY
ATTORNEY

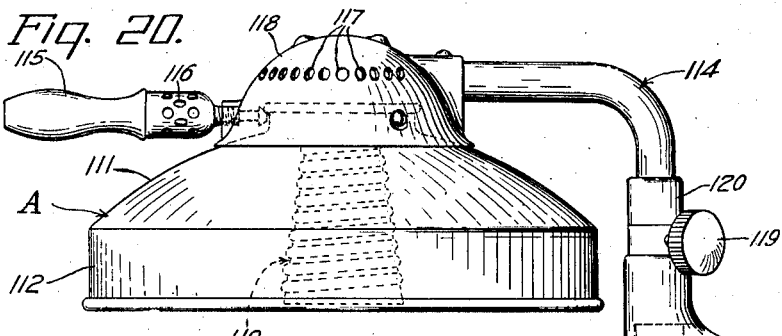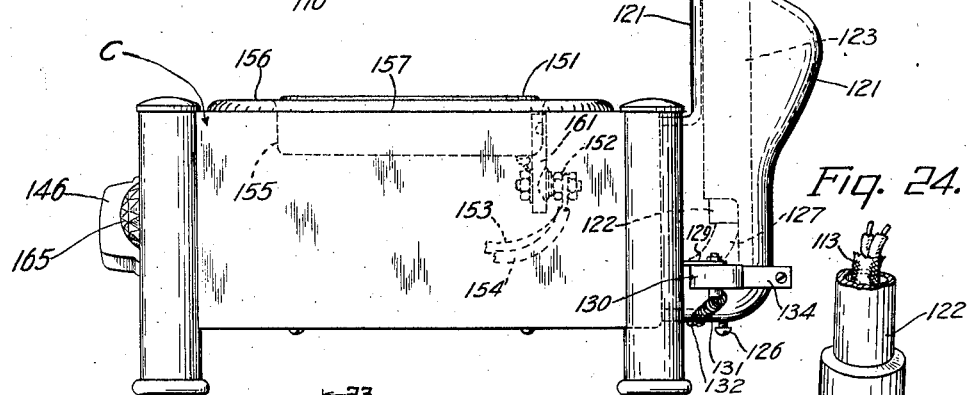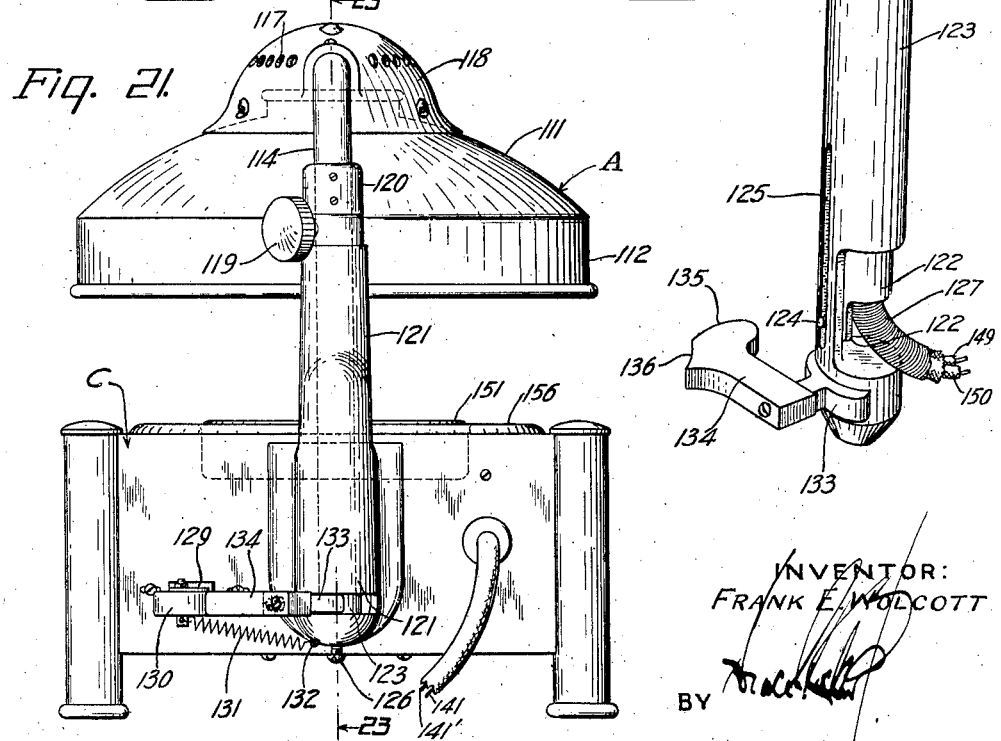

April 30, 1940.   F. E. WOLCOTT   2,198,645
ELECTRIC COOKING DEVICE
Filed July 10, 1935   7 Sheets-Sheet 7
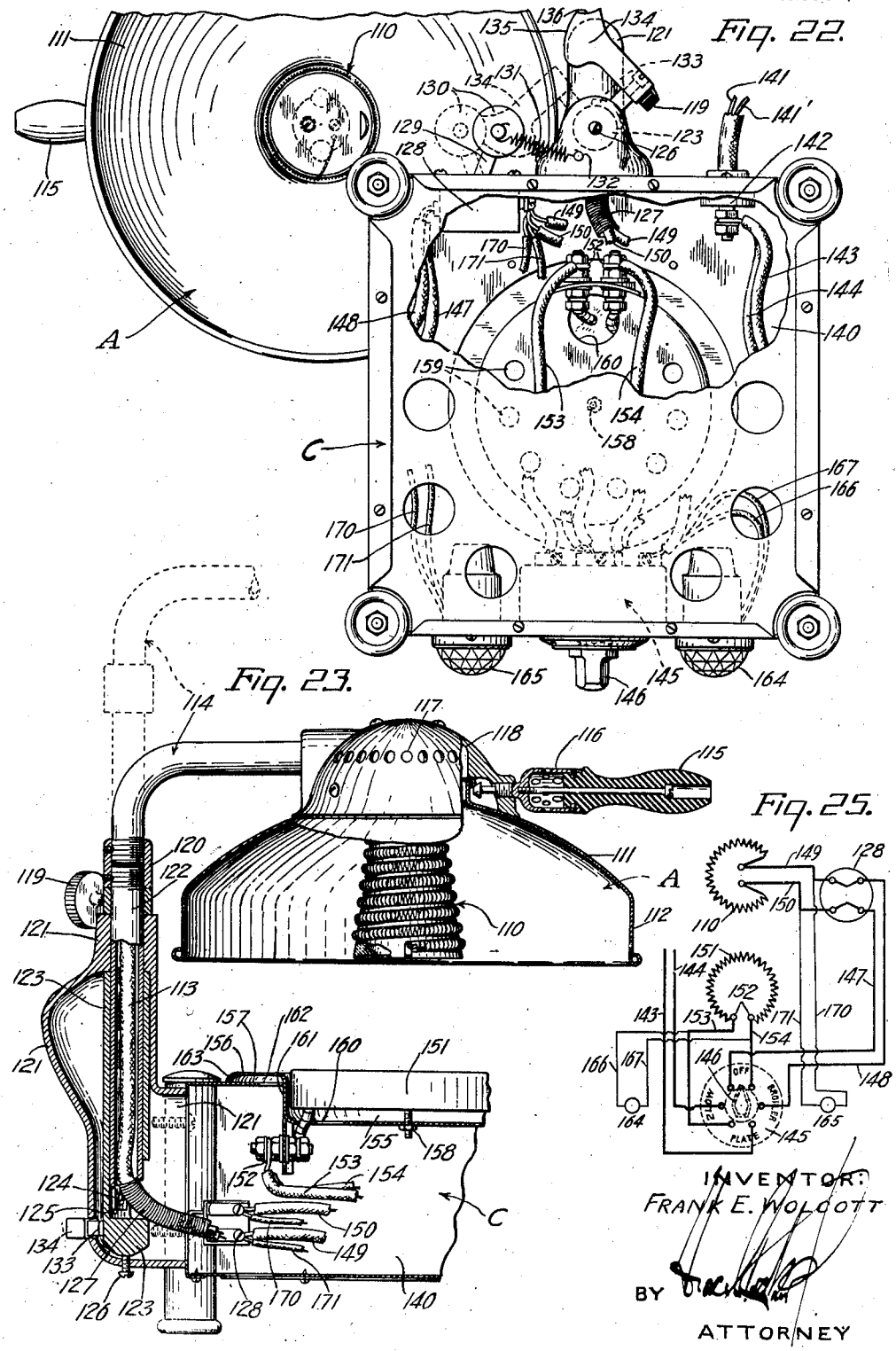

Patented Apr. 30, 1940

2,198,645

UNITED STATES PATENT OFFICE 2,198,645

ELECTRIC COOKING DEVICE

Frank E. Wolcott, West Hartford, Conn., assignor, by mesne assignments, to The Silex Company, a corporation of Connecticut (1936)

Application July 10, 1935, Serial No. 30,647

29 Claims. (Cl. 219—34)

My invention relates to electric cooking devices.

My invention has among its objects to provide an improved electric cooking device making it possible to utilize radiant electric heat in an improved manner to produce wholly new cooking effects. A further object of my invention is to provide an improved construction especially adapted to the cooking of meat, fish or the like, whereby it is made possible to obtain not only a new initial searing effect which tends to retain the juices in the meat, and, a new subsequent cooking which cooperates to produce cooked meat of markedly improved flavor, but whereby, although the food is accessible and visible during cooking, it is also made possible to consume the gases generated during cooking and thereby minimize the odors usual in cooking, in a wholly new and effective manner. A still further object of my invention is to provide an improved stove having such improved heating means therein associated with improved ventilating and controlling means therefor whereby the structure is adapted to convenient use in broiling or frying. Other objects of my invention are to provide an improved stand associated and cooperating with such an improved heater and likewise having improved supporting and controlling means, and improved utensils adapted to cooperate with the heater. Another object of my invention is to provide an improved stove having the advantages set forth and also of a portable type readily adapted to use in restaurants or homes, and adapted to provide a markedly effective and simple electric stove of large capacity and yet capable of being provided at small expense. These and other objects and advantages of my improved construction will, however, hereinafter more fully appear.

In the accompanying drawings, I have shown for purposes of illustration certain embodiments which my invention may assume in practice.

In these drawings—

Figure 1 is a perspective view of one illustrative embodiment of my invention, the heating unit and reflector being shown in one operative position relative to the broiler pan or griddle on the stand beneath the same;

Fig. 2 is a top plan view of the stand with the heater unit and reflector removed and portions of the top of the stand broken away to facilitate illustration;

Fig. 5 is a detail sectional view on line 5—5 of Fig. 2;

Fig. 6 is a side elevation of the device of Fig. 1 showing the reflector in process of removal;

Fig. 7 is an enlarged sectional view of the reflector and heating unit;

Fig. 8 is a further enlarged sectional view on line 8—8 of Fig. 7;

Fig. 9 is a bottom view of the reflector holder member with the reflector removed;

Fig. 10 is a top plan view of the heating unit removed from its canopy;

Fig. 11 is a bottom plan view of the heating unit with the bottom plate thereon;

Fig. 12 is a bottom plan view of a heating unit with the bottom plate removed;

Fig. 17 is a wiring diagram;

Figure 18 is a plan view similar to Fig. 2, but showing a modified construction of reflector raising and lowering mechanism;

Fig. 19 is a detail sectional view on line 19—19 of Fig. 18 showing the rack and gearing mechanism thereof;

Fig. 20 is a side elevation of a modified form of stove;

Fig. 21 is a rear view thereof;

Fig. 22 is a bottom plan view of this construction with the reflector swung into inoperative position and a portion of the bottom of the stand broken away to expose the structure therein;

Fig. 23 is a detail sectional view on line 23—23 of Fig. 21 showing the heating units and the adjustable tube connection through which the conductors extend to the vertically adjustable heating unit in the different vertical positions thereof;

Fig. 24 is a detail perspective view of the lower end of the sliding tube connection of Fig. 23, and Fig. 25 is a wiring diagram for the modified construction shown in Figs. 20 to 23.

In the illustrative construction shown in Figs. 1 to 21, I have shown an improved upper adjustable cooking unit, generally indicated at A, cooperating with suitable improved receptacle means B carried on an improved support C, while the elements A and B also have associated therewith improved reflecting and ventilating mechanism and improved controlling mechanism, respectively, hereinafter described, whereby the device is enabled to operate in a new and effective manner to produce improved results, as will hereinafter more fully appear.

Figure 3:
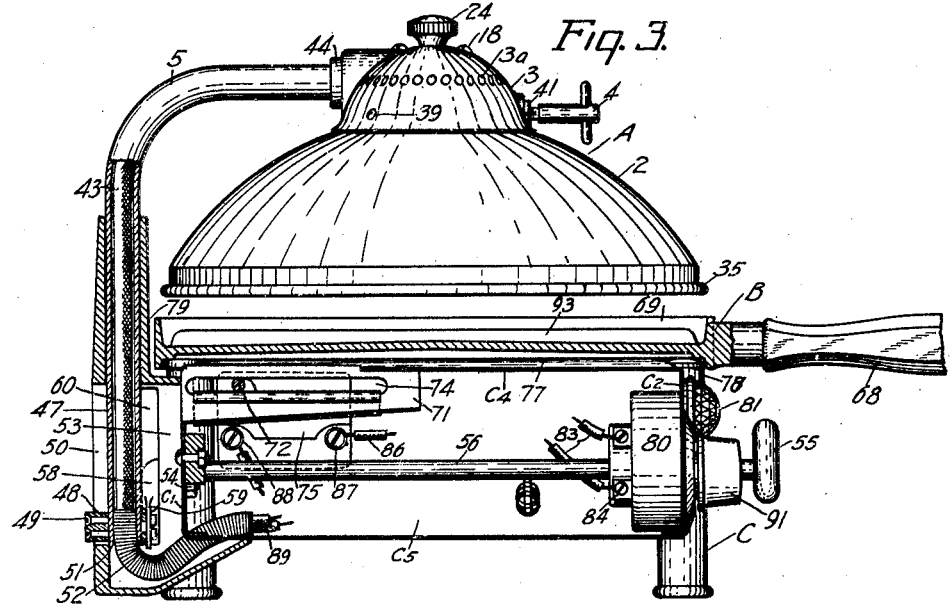
Fig. 3 is an enlarged sectional view on line 3—3 of Fig. 2 but also showing the griddle in section and showing the reflector in side elevation.
Figure 4:
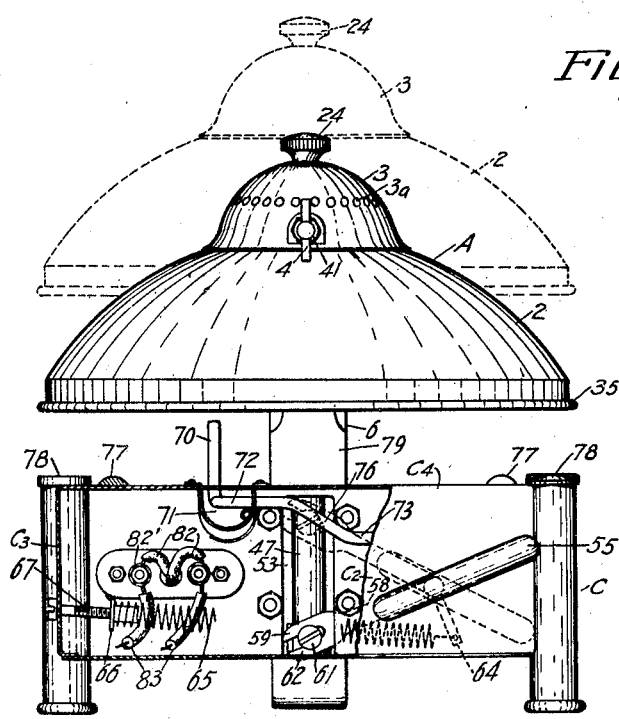
Fig. 4 is a front elevation and partial section of the structure shown in Fig. 1 with the reflector shown in dotted and full lines in its extreme up and down positions and with the stand in section on line 4—4 of Fig. 2.
Figure 13:
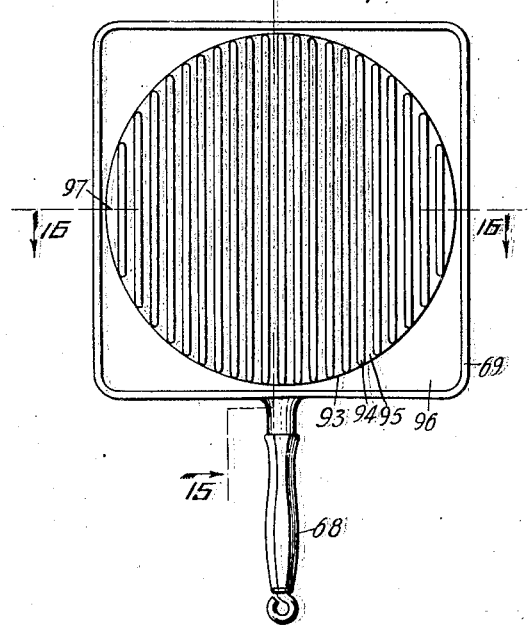
Fig. 13 is a detail plan view of the broiling surface of the griddle.

Referring more particularly to the unit A, it will be noted that the latter comprises, as shown in Figs. 3 and 7, a refractory electric resistance carrying unit of large radiant capacity and generally indicated at 1, and of an improved construction and mounted in an improved manner in a reflector 2, which is also mounted in an improved manner on an improved canopy or support 3 and connected thereto through an improved connection. Herein, the unit A includes a handle 4, and the reflector support 3 is in turn carried on a generally L-shaped tubular supporting member or standard 5 which is also vertically adjustable in an upstanding support 6 carried on the rear end of the main support C. Thus, conductors connected to the resistance element 1, may extend up through this tubular member 5 in such manner as to permit the unit 1 to be operative in any desired vertical position thereof relative to the support C or any food contained in the receptacle means B resting on the top surface of the support C.

Referring more in detail to the refractory resistance carrying element 1, it will be noted that the same is generally cylindrical in form with a tapered portion between cylindrical portions of different diameter and length at its opposite ends and nearer the upper end portion which is of smaller diameter. As shown, the heat carrying element 1 is also externally spirally grooved and carries a suitable coiled resistance wire 7 in the grooves therein. This wire 7 is, in turn, provided at its upper and lower ends with plain or uncoiled strands 8, 9; one strand 8 extending spirally upward in the groove leading from the top of the coil or the main radiant portion (Figure 8), while the other end 9 extends laterally (Figure 9) from the bottom of the portion 7 through an aperture 9a into a large hollow chamber 10 in the member 1. As shown, this chamber 10 extends from the bottom of the member 1 throughout about two thirds of the height thereof and has a relatively thin outer wall. Moreover, these strands 8, 9 are connected to vertically disposed frustro-conical tubular contacts 11 which are attached to the upper end of the member 1 and held in place by vertically disposed screws 12 extending upward from the chamber 10 and having heads in the latter and threaded portions threaded into the lower ends of axially threaded portions 13 in the contacts. As shown, the end of strand 8 extends through a lateral slot 8a in the top of the member 1 and under its contact 11, while the end of the strand 9 is clamped by the head of its screw 12 in the chamber 10 and connected by that screw to its contact 11. These contacts 11 are, in turn, seated in correspondingly tapered sockets 14 in cooperating contact members 15 carried in suitable apertures in an upper insulating support 16 which is, in turn, suitably supported inside an aperture 17 in the member 3. Herein, the member 16 is attached to the member 3 by screws 18, the slotted ends of which are accessible from the top of the member 3, while the nuts on the opposite ends thereof are disposed in correspondingly shaped and fitted apertures in the opposite face of the member 16. Herein, it will also be noted that an insulating washer 19 is provided between the top of the member 16 and the inside top surface of the member 3, while a metal washer 20 is between the washer 19 and the top of the member 3. Attention here is also directed to the fact that an axial screw 22 is carried by the upper end of the member 1 and suitably seated therein against rotation, as by a nut 23 on its lower end seated in its correspondingly fitted aperture in the member 1. This member 22 also extends axially through suitable axial apertures in the members 16, 19, 20 and 3 and has its threaded end projecting above the latter and carrying a knurled nut 24 whereby the tapered contacts 11, 15 may be drawn together by rotation of the nut 24 with the fingers. Moreover, note that the contacts 15 are suitably connected to the member 16, as by screws 25 having their upper ends disposed beneath the insulating member 19, and that conductors 26 leading through grooves 27 in the member 16 and branching on opposite sides of one of the screws 18, are connected to these screws 25 and the contacts 15 by being clamped by the screws between the contacts 15 and coaxial washers 28. Here also the lower end of the member 1 is provided with a lateral flange 29 having notches 30 therein, herein equally spaced; while a metallic enclosing disc 31 is herein also provided with upstanding lugs 32 thereon, receivable vertically in these notches 30 and rotatable therefrom and above the flange 29, to secure this disc in place. As shown, the disc is also provided with parallel slots in its periphery, forming a tongue 33 adapted to be turned up into the aperture 9a in such manner as to secure the disc in definite angular relation on the bottom of the member 1, yet out of contact with the resistance member 7 or the strand 9 leading therefrom.

Here attention is particularly directed to the high capacity of this resistance unit which is far in excess of any such unit of which I am advised. In practice, this unit has a wattage of 2000, and is accordingly such as to develop a very high temperature within the reflector. In fact, the heat thrown downward is so intense and penetrating that it immediately sears meat in such manner as to seal in the juices before the latter start to run in any quantity. Moreover, it is exceedingly fast in operation following the initial searing, the same being adapted to broil ordinary steaks and chops on both sides in from seven to ten minutes, thick three-pound steaks in from thirteen to eighteen minutes, chicken in twelve to fifteen minutes, frankfurters in three to four minutes, sandwich steaks in two to four minutes, etc. Further, the unit comes up to heat in approximately one minute. Due particularly to the tapered contacts 11, 15, the structure is also rugged and adapted to stand up and to continue to function satisfactorily electrically despite continued high temperatures, while also enabling the unit to be readily removable whenever desired. Moreover, all of the heat which is developed is effectively used, the unit 1 and disc 31 cooperating with the inner reflecting surface on the reflector 2 in distributing the heat with satisfactory uniformity over the entire surface below the heating unit and reflector and eliminating hot spots which otherwise would cause burning.

Cooperating with the resistance carrying unit 1 is the reflector 2. This is preferably a parabolic reflector adapted to direct the reflected heat downward in an effective manner upon food disposed in a receptacle B carried on the top of the base C. As shown, the reflector is provided with a shallow cylindrical rim portion 35 at its lower end, and with a rolled back upper end 36 of smaller diameter, forming a flange and adapted to be engaged over spaced members 37 on the member 3 while providing an axial aperture of larger diameter than the maximum diameter of the unit 1, and also a restricted annular passage between the member 16 and the neck portion terminating in the end 36 in such manner as to require that the rising gases from the food pass over the heating element in their path to the canopy outlets 3a. Herein, the members 37 are in the form of bevelled members, two of which are attached to lugs 38 on the member 3 by screws 39, while a third is adjustably connected thereto and operable by the rotatable handle member 4. Also, the adjustable member 4 is provided with a threaded portion 40, the inner end of which forms this third member and on which are, in turn, threaded nuts 41, 42 also threaded to one another and engaging opposite faces of the member 3. Attention is also directed to the annular series of small ventilating apertures 3a provided in the canopy member 3 above the handle 4 and near the top of the member 16 and adapted to permit such a circulation as very materially to improve the effects obtainable while reducing the temperature of the member 3 and of the terminals for the unit 1, as well as that of the handle 4.

Thus it will be evident that upon rotating the member 4, it is possible for the member 37, which is attached to the portion 40 thereof, to be moved in such a direction as to release the flange 36 on the reflector 2 and accordingly permit the latter to be vertically disposed on or removed from the other members 37 and the member 3 at will, without requiring removal of the unit 1. This is a feature of importance as when broiling the reflector frequently becomes spattered with grease and, accordingly, has to be frequently removed for cleansing. Attention is also particularly directed to the fact that the ventilating apertures 3a are of great importance in making possible the use of the improved structure, the same not only providing for the escape of rising heat and reducing the operating temperature of the canopy and prolonging the life of the electrical connections therein, but also having the function of providing proper outlets for the rising gases and cooperating in such manner with the intensely hot unit 1 as to cause the gases escaping from the cooking food to be substantially consumed before escape, so that there is practically no odor.

The reflector 2 and the member 3 which carries the same and the heating unit 1 are both carried on an improved support 5. Herein, this support 5 is in the form of a tubular L-shaped member and acts as a conduit for the conductors leading to the unit 1, while these conductors herein are in the form of a cable 43 and suitably insulated from the member 5 which is of metal. Further, it will be noted that the upper end of the member 5 is slit at 5a (Fig. 7) and threaded into a lug 44 on the back of the member 3 and held in place thereon by a nut 45 which, as a result of the split, also acts to hold in place an insulating bushing 46 through which the bare conductors 26 extend to the contacts 15. As shown, the other end of member 5 forms a sliding coupling sleeve 47 which is vertically slidable in the support 6 and adapted to be held in proper angular relation thereon by means of a collar 48 on the lower end of the sleeve 47 and carrying a projection 49, while being slidable by mechanism hereinafter described in a vertical slot 50 in the lower half of the back of the support 6. Thus, the heating unit 1 and reflector 2 may be adjusted by moving the support 5 so that the projection 49 occupies any desired position in this slot 50, all in such manner as to vary the heat upon food on the receptacle means B beneath unit 1 and reflector 2.

Attention is further directed to the means provided for insuring free movement of the conductors leading to the unit 1 in the various upward and downward movements of the support 5. Here it will be noted that the tubular member 47 is provided with an open lower end 51. Further, the lower end of the conductor cable 43 is so encased in helically wound light spring wire as to form an external metal cable or sheath 52 of a spring character adapted to be straightened out as it is pulled into the lower end of the member 5 while effectually preventing wear or undue flexing and breaking of the inner insulated cable 43. Attention is also directed to the fact that the cable 43 is extended a substantial distance into this flexible wire sheath 52. As shown, it will also be noted that the upstanding support 6 is preferably in the form of a casting having opposite the slot 50, an open vertical side leading through a corresponding opening in the full depth of the back side face cl of the support C while the hollow or chamber 53 thus formed in the member 6 also has a bottom extension below the bottom of the slot 50 to receive the curved portion of the sheath 52 in the bottommost position of the parts. Here it will also be noted that the member 6 is suitably removably attached, as by screws 54, to the back of the support C.

As a result of the above described vertical adjustment of the unit 1 and reflector 2, and the improved relation of these elements to one another and to the extent of the vertical adjustment, it is made possible to facilitate the removal of the reflector. More particularly, it will be noted that herein the reflector 2, when in position around the unit 1, is of substantially the same depth as the latter, while the length of the vertical adjustment of the members 5, 1 and 2 is such as to permit the bottom of the unit 1 to clear the top of the reflector 2 whenever the member 5 and unit 1 are in their topmost position and the receptacle B has been removed from the top of the support C. Thus, after removing B and lowering A, it is only necessary, by manipulation of the member 4, to release the reflector 2 in its full line position shown in Figure 6 and thus to permit the unit 1 to be raised into the full line position shown in that figure, wherein its bottom is disposed above and clears the top of the reflector 2 in such manner as to permit the reflector 2 to be readily pulled off laterally as for cleansing or the like. Here also, of course, it will be evident that with the parts 5 and 1 left in this same position, the reflector 2 may be readily reassembled after cleansing, whereupon the receptacle means B may be returned to its operative position on the support C and cooking resumed with the elements 1 and 2 at any selected height relative to the receptacle means B.

Herein it will be noted that improved manually operated means are provided for adjusting the elements 1 and 2 relative to the support C. As shown, these means include a rotatable handle 55 carried at the right hand side of the front face c2 of the support C. Herein this handle 55 is fixed to and rotatable with a longitudinally extending rod 56 suitably journaled as at 57 in the rear and front faces c1, c2 of the support C. As shown in Figure 2, the rear end of this member 56 also is provided with a lateral extension 58 outside the rear face c1 and forming a crank arm. This crank arm is also provided with a vertically disposed portion 59 which extends into a long vertical slot 60 in the side of the casting 6 which, in turn, extends from substantially the top of base face c1 to below the bottom thereof. As shown, this portion 59 is also suitably slotted at its extremity and pivotally connected as by a screw 61 to the collar 48 on the bottom portion 47 of the member 5, while the extremities 62 of the slotted portion thereof extend through a vertical slot 63 in the member 6, opposite the slot 60, which is of such dimensions as to permit the crank 58 to move freely about the axis of the rod 56 in either direction. Attention further is directed to the improved means provided for holding the handle 55 and its connected mechanism, together with the heating unit 1 and reflector 2, in any selected position of adjustment. This mechanism herein includes a laterally projecting pin 64 on the rod 56 and a transversely disposed coiled spring 65 connected at one end to this pin 64, and at its opposite end having one end of the coil extended through a bushing 66 adjustably threaded on a screw 67 which projects inward from the left hand face c3 of the support C. Thus it will be evident that whenever the handle 55 is operated in either direction, the entire adjustable cooking unit A will be raised or lowered, depending upon the direction of operation, and maintained in the position to which it was moved; the construction being such as, through the relation of the parts and upon a suitable adjustment of the tension of spring 65, to provide an effective operating and balancing means for the unit A. Accordingly, manipulation of the handle 55 is all that is necessary to raise or lower the element A to permit the separation of the parts shown in Figure 6 or to obtain a wide range in variation in heating effect upon the food on the receptacle B. Also, in the bottommost position of the unit A, and when food is high on the receptacle means B, raising may be desirable to permit the placing of the receptacle means B upon the support C or the removal of this receptacle means from said support.

Herein, it will also be noted that improved current controlling means are provided for the unit 1 operative upon relative movement between the elements A and B, two forms of this mechanism being disclosed. Referring first to that shown in Figures 1–5, it will be noted that the means illustrated therein comprises switch controlling means automatically operated by the receptacle means B as the same is moved into or out of operative position on the support C and beneath the heating unit A. More particularly, it will be noted that the element B, herein in the form of a broiler pan, hereinafter more specifically described, is equipped with a handle 68 and with an upwardly and downwardly projecting enclosing rim or edge portion 69. Further, the back part of this edge portion 69 is adapted to engage with an upstanding switch controlling finger or member 70 projecting upward above the top of the base C into the path of the portion 69 as the receptacle means B is slid back between the support C and heating unit A into operative position. As shown, a longitudinal trough 71 is provided in the top surface c4 on the left hand side of the member 5; this trough herein being relatively short and opening through the rear face c1 of the support C and extending therefrom approximately one-third of the distance to the front face c2. Further, it will be noted that the member 70 is in the form of a vertical extension on a horizontal portion 72 extending generally lengthwise of the trough 71 and movable therein, and which is, in turn, disposed at right angles to a substantially longer arm 73 moving in a longitudinal slot 74 in one side wall of the trough 71 and forming an actuating means for any well known form of snap switch generally indicated at 75 and herein a toggle switch, adapted to be reversely actuated with a snap action upon reverse movements of such a swinging actuator 73. As the switch per se forms no part of my present invention, it is not believed necessary to describe the same more specifically herein than to say that the same is of a well known make and constitutes a unit adapted to be suitably attached to the inside face of the right hand side face c5 of the support C at a point above the shaft 56 so that the member 73 will swing freely relative to the latter to actuate the switch reversely, while spring means 73a are provided to insure the return of the member 73 to the "open" position of the switch whenever the member 73 is not held in "closed" position. Note here also that to permit maximum movement of the cable sheath 52, the portion 73 is bent upward near its outer end as shown at 76, while the slot 74 is disposed relatively close to the top of the trough 71. Thus, with the switch 75 normally biased toward the full line position shown in Figure 2, wherein the part 70 is in the trough 71 and within the path of the rim portion 69 on the member B when the latter is inserted, it will be evident that this portion 69 will engage the portion 70 and thus automatically throw the switch 75 from the "off" position indicated in full lines in Figure 2, to the "on" position indicated in dotted lines in that figure. Further, with the switch actuating member 73 biased toward the full line, or "off" position, it will be evident that whenever the receptacle means B is withdrawn from operative position beneath the cooking means A, the switch actuating member 73 will move automatically to its "off" or full line position illustrated and thereby open the circuit. In other words, due to this improved construction, as the receptacle B carrying the food is inserted under or removed from beneath the cooking element A, the current supply to the latter will be automatically controlled in a most effective and efficient manner which operates to minimize the amount of current required and to insure not only quick and easy, but safe operation of the mechanism by even a careless operator.

Attention is also directed to the improved means provided herein for permitting pre-heating of the unit 1, if desired, before the receptacle means B with the food thereon is placed under the same, or pre-heating of both the unit 1 and pan B before food is placed on the latter. These means herein include a latch member 70a pivoted at 70b and adapted to engage the portion 70 on the switch actuating member in such manner as to hold the latter in "on" position when desired. Thus, by swinging the latch 70a into this position when the member 70 is manually moved into "on" position, the switch 75 may be latched in "on" position in such manner as to save the minute otherwise required to bring the unit I up to full heat. Accordingly, when the greatest speed is required and the whole device is cool, it is possible first to throw the member 70 by hand and throw down the latch and leave the mechanism to come up to heat while the food is being placed on the broiler B. Of course, as soon as the broiler B is placed in position, the latch can be swung into inoperative position, if desired, and the member B thereafter depended upon for automatic control in turning on or off the current, as desired.

Referring next more particularly to the receptacle means B used to operate the switch controlling member 70, note here that the portion 69 on the same is adapted to be slid into operative position on the support C over spaced parallel supports or guides 77 projecting above the top face c4 of the support C. Further, note that these guides 77 are disposed at such a height relative to round corner posts 78 at the four corners of the support C, that when the portion 69 is supported on the portion 77, it will clear these corner posts. Note here also that the portion 69 projects above and below the enclosed body of the receptacle means B, and that the latter, while generally rectangular, is rounded at the corners in such manner as when the portion 69 passes beyond the end of the supporting guides 77, the rounded corners of the member B will drop down over the round posts 78 and be definitely located relative to the support C whenever in operative position thereon. Moreover, it will be noted that in this operative position, the outer rear face of the portion 69 will be disposed slightly in front of a broiler movement limiting face 79 on the member 6, as shown in Figure 2, while the actuating portion 70 of the member 73 will also be disposed slightly in front of this face, as shown in that figure. Accordingly, it will be evident that the movement of inserting the receptacle means B into operative position on the support C and beneath the cooking means A, is a very easy one, the support C simply sliding naturally and easily over the guides 77 into the desired final position and being held therein by the improved inter-connection with the parts. Also, if during insertion, the rear edge 69 is permitted to slide on the guide 77 toward the abutment face 79 while in alignment with the corner posts 78, the remote corners of the means B will automatically slip over the remote posts 78, while the near corners will drop naturally over the near posts 78 when the handle 68 is released in a normal manner.

Operatively associated with my improved mechanism is improved electrical controlling and indicating mechanism. Herein both of the above are disposed on the front face c2 of the base C, and the same include a switch, generally indicated at 80, and a pilot light indicated at 81. Referring to the switch 80, it will be understood that the same may be of any well known type. Further, as the switch per se forms no part of my present invention, it is believed sufficient here merely to state that the same is of a well known snap switch type available upon the market and preferably has two opposite "off" positions and two opposite "on" positions. Herein, it will be noted that a line connection 82 extends to terminals 82' inside the back wall c' of the support C and these terminals are connected by conductors 83 to terminals 84 on the switch, while terminals 85 thereon are connected through conductors 86 to terminals 87 on the switch 75. Thus, with the switch in "on" position, when the switch actuating member 73 is swung by engagement of the portion 69 on the broiler pan with the portion 70 on the switch actuating member, current will flow through the switch 75 to the terminals 88 and therefrom through conductors 89 to the resistance coil 7, while passing through the terminal connections including the conductor 10 ends 26 connected to the contacts 15. Further, it will be noted that whenever current flows through the terminals 88 to the cooking element 7, current will flow through a parallel connection 90 to the pilot light, indicated at 81, and that the current supply to the cooking element 7 will be automatically made or broken as the receptacle means or pan B is moved into or out of operative position, while the pilot light 81 will be on whenever the current is on unit 7. Also, the switch 80 provides a main means under manual control and is operative at will to cut out the entire device when the operating member 91 of this switch is moved laterally in either direction from its two vertical "off" positions.

In my improved construction, the receptacle means B is also of an improved construction enabling it to cooperate in an improved manner with the cooking element A. Referring first to the member B when arranged for broiling, as shown in Figs. 1 and 3, it will be noted that improved broiling grid means are provided on the top surface of the member B whereby markedly improved cooking results are obtained. Herein, the member B, while of substantially rectangular form, is provided with a grid surface, indicated at 93, of generally circular form and of substantially the diameter of the reflector 2. As shown, this portion 93 comprises parallel grid members 94 of different length and raised above both the portions 95 between the grid members, and still lower portions 96 surrounding the portion 93 and within the rim 69. Further it will be noted that the portion 93 is, generally speaking, divided into halves. Thus, a high line 97 divides the ribs 94 in half and forms a transverse divide from which any liquids will flow either to the front or back of the broiler pan B. Moreover, it will be noted that by sloping the portions 96 toward the corners, all liquid deposited on the grid surface 93 will tend to flow into the corner pockets 96 which are outside the grid surface. In other words, with the grid surface 93 of the same diameter as the reflector 2, all liquid passing on to the grid surface 93 will be caused to flow from beneath the reflector 2 in such manner as to minimize smoking or "burning on," while also making it possible quickly to collect any escaping fluids out of the path of the intense heat directed downward below the reflector 2.

Figure 14:
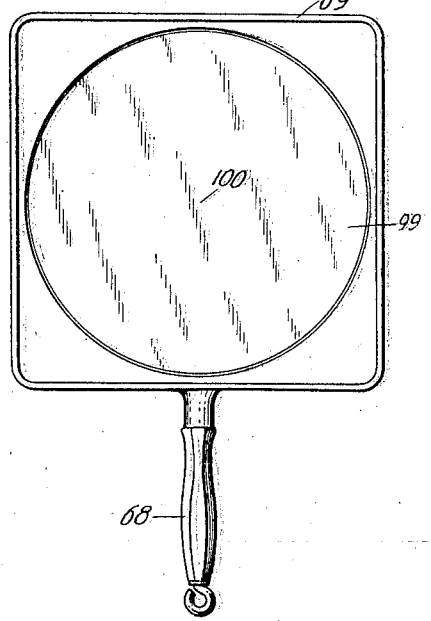
Fig. 14 is a detail plan view of the frying surface of the griddle.
Figure 15:
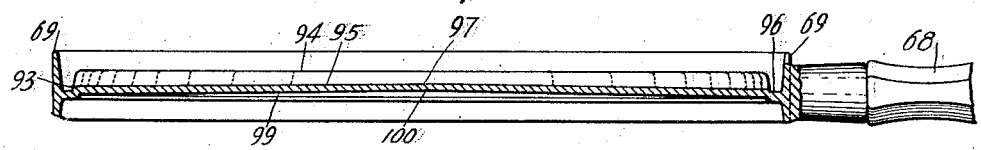
Fig. 15 is a sectional view on line 15—15 of Fig. 13.
Figure 16:
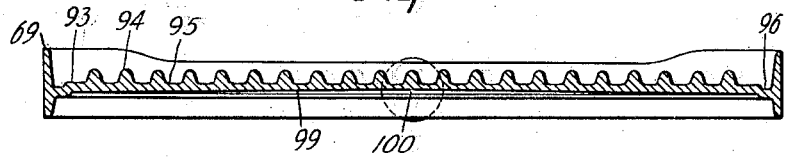
Fig. 16 is a sectional view on line 16—16 of Fig. 13.

Here attention is also directed to the improved frying means which are herein likewise provided on the receptacle means B and within the underside of the rim portion 69. As shown in Figures 14, 15 and 16, these comprise a frying surface 99 which it will be noted slopes from all points on its periphery toward the center 100 which, by reason of the raised line 97 of the broiler grid on the opposite face, is readily adapted to be recessed to form the low point as desired. Obviously, this frying receptacle 99, by reason of this structure and the rim 69, is adapted to use wherever cooking with deep fat is desired. Further, while either the broiler or grid face may be used interchangeably as desired, it will be noted that when either is in use the member B will be freely slidable on the support 77 and fit on the corner posts or positioning means 78 as heretofore described.

In the operation of the device, it will be evident that with the parts in the position shown in Figure 1, current will be supplied to the unit 1 as a result of the current connections established by the switch 80 and the actuation of the switch 75 by the member B, while the indicating light 81 will be on. Thus, with meat to be broiled on the broiler surface 93 of the member B, and the unit A in a lowered position, this meat will be subjected to an intense heat delivered from the unit 1 and reflected downward by the reflector 2. This heat acts to sear the meat immediately and completely before the juice starts to run in any quantity. In practice, this searing heat is so intense as to enable both sides of the meat to be seared with no substantial loss of juice. Further, it is noted that not only the flow of juice from the raw meat is exceedingly small, but that, instead of being of the expected red color, it is quite light or white in color; indicating, it is believed, that a greater amount of juices, and accordingly of the flavor of the meat, is retained therein. After searing, it is possible, if desired, to obtain a slower but more penetrating heat for cooking by raising the unit 1 to the extent desired through operation of the handle 55; the unit 1 then remaining in any selected vertical position by reason of the operative connections to the handle including the counterbalancing spring. During searing and cooking it will also be noted that the gases, as distinguished from being diffused, will rise, by reason of an induced draft, up along the heating unit 1 and to the apertures 3a in the canopy 3. Moreover, it is found that in my improved construction and presumably as a result of the direction of the gases over the unit 1 and the action of the radiant heat thereon, these gases are substantially consumed in their passage to the apertures 3a, so that practically all cooking odor is eliminated; a feature of marked importance when, as is frequently the case, the broiler is used for back-bar service in restaurants, hotels, drug stores, or the like. It will further be noted that such juices, or fat, as may be extracted from the cooking meat, are delivered on the ribbed portion 93 of the broiler member B and are further directed between the ribs 94 thereof into the several lower corner portions 96 disposed outside the zone of the reflector 2. Thus, a minimum of liquid remains at any time in the path of the heat to cause smoking or burning on with resultant gases and odors. When the meat is broiled, the mere withdrawal of the member B from beneath the reflector 2 results in the automatic operation of the switch 75 to break the circuit to the unit 1, and further to turn off the pilot light 81. Moreover, it will be noted that, with the circuit thus broken by the removal of the member B, it will remain broken until the member B is returned into operative engagement with the portion 70 of the switch actuating member 73, while the light 81 will also remain off until the switch 75 is thus closed. If, of course, it is desired to keep the switch 75 closed, as during pre-heating, by using the latch 70a to hold the member 70 in on position, it will also be evident that the light 81 will also remain on. It will here further be evident that the same general results described above in connection with broiling, will be obtained when using the reverse or frying side of the member B, with the exception of the draining away of the liquid by the grid surface 93, the fat, of course, instead accumulating in the central aperture 99 used for frying. Here, however, it is also found that due to the action of the heating unit on the gases generated during frying operation, these gases are herein substantially consumed before their escape from the apertures 3a, in such manner as to minimize the objectionable odors which otherwise would be diffused around the device and make its use objectionable in many locations.

As a result of my improved construction it is found that improved cooking results are obtained, which, in the opinion of thoroughly experienced chefs, are on a par, or possibly better, than those obtainable with a charcoal fire, while markedly improved as compared with any previously known electric cooking device. Further, by reason of the new intense searing heat and the ready adjustment of the cooking element into a higher position for more slow but more penetrating heat, it is made possible to obtain effects as regards flavor, heretofore wholly unobtainable in an electric cooking device. Moreover, through minimizing the amount of overheated metal in contact with the food including the elimination of any metal grid between the food and the radiant heater, it is made possible to minimize the toughening effect caused by the overheated metal touching the meat. Attention further is directed to the markedly high speed of cooking obtainable due to the intense heat generated and the concentrated distribution of the same over the area beneath the reflector 2. Attention here is also particularly directed to the fact that this distribution is even over the whole area of the grid surface 93 in such manner as to eliminate the hot spots which otherwise would cause burning. At the same time, it is found that the device is exceedingly economical in operation, the same, for example, costing for operation but ten cents per hour of actual use where current is available at a price of five cents per k. w. If desired, the reflector may also be readily removed by first lowering the same into its bottommost position and then releasing the same through operation of the member 4, and thereafter raising the unit 1 to its top position, all without requiring any change or handling of the unit 1. The latter unit may also be readily removed, when desired, by simply removing the knurled nut 24 with the fingers, whereupon the unit 1 may be pulled down to cause the contacts 13 and 15 to be separated. Here attention is also directed to the fact that these contacts are of such construction as not to be affected by the high temperatures or by high heat corrosion. Further, it is found that the heating unit 1 is self-cleaning, its structure being such that there is no chance for greases to accumulate thereon. These and other advantages of my improved construction will, however, be clearly apparent to those skilled in the art.

In Figs. 18 and 19 I have illustrated a modified construction which may be used, if desired, as a raising and lowering means in lieu of the rod 56 with the crank 58 and spring 65, although this modified construction is not preferred. As shown, it includes a rotatable knob 101 located in the same general position as the handle 55 and carried on a shaft 102 which in turn has its rear end projected beyond the support C into a casting c6 on the back of the support C. Herein, also, a spur pinion 103 is carried on the projecting rear end of the shaft 102 and meshes through a series of like intermediate pinions 104 rotatably mounted in the casting c6, with a rack 105 on the lower end of the member 5. Thus, when this member 102 is rotated in a clockwise direction, the member 5 will be moved up and, through the engagement of the gears, will be maintained in any selected up position, while also being moved downward when reversely operated and being similarly held in any position. Also, it will be noted that a stop 106 is provided to limit the upward movement of the rack 105 and that an end abutment 107 is provided on the latter to limit the downward movement thereof, the stop 106 engaging an abutment not shown, while the end 107 engages the bottom of a chamber 108 in which the rack is movable.

In Figures 20-25 I have also illustrated a modified construction which, while not preferred, may also be used if desired; this construction being one including a swinging cooking element A and having automatic switch mechanism for breaking the circuit thereof when the same is swung relative to the support C, while the latter also carries a stove and associated control mechanism for both the heating element A and this stove.

Referring more particularly to Fig. 20, it will be noted that the heating unit 110 is generally similar to that previously described but of modified frustro-conical construction, while the same is also disposed within a generally similar reflector 111 having a deeper cylindrical rim portion 112. As shown, the unit 110 is supplied from a cable 113 extending through a tubular member 114, corresponding to the member 5 heretofore described and likewise vertically adjustable; while the reflector 111 is also releasable when desired by rotation of a handle member 115, generally corresponding to the handle 4, heretofore described, but herein of insulating material and having additional ventilating means 116. Here, as before, a series of apertures 117, corresponding to the apertures 3a, is also provided in a canopy 118. Further, it will be noted that the member 114, though vertically adjustable, is manually pulled up and that it is adapted to be held in different positions of vertical adjustment by means of a set screw 119 operating between a collar 120 on the member 114 and the top of a casting 121, corresponding generally to the part 6 heretofore described. Moreover, it will be noted that the lower end of the member 114, herein in the form of a separate member 122, is attached to the member 114 by the collar 120 and is slidable vertically in a sleeve 123 and has a pin 124 protruding through a suitable slot 125 therein; this pin being movable in the slot as the member 114 is raised or lowered, while the member 123 is suitably positioned in the member 121 by a bottom screw 126. Note here also that a flexible metal sheath 127, corresponding to that heretofore described, is provided on the lower end of the cable 113, as it passes into the support C through a suitable lateral opening in the member 123.

As regards the switch mechanism, note here that the element A is movable about the axis of the member 123 from a position directly over the support C and indicated in Fig. 21, to the inoperative position shown in Fig. 22, while switch mechanism is provided for automatically cutting off the current supply to the heating unit 110 as it is so swung in one direction, and re-establishing its circuit connections when it is reversely swung. These connections herein include a snap switch 128 of any well known construction having a pivoted operating member 129 extended therefrom and carrying a roller 130 which is connected by a coil spring 131 with a pin 132 on the bottom of the member 121. Further, it will be noted that near the bottom of the member 123, a lug 133 is suitably fixed and carries a cam member 134 having a rounded convex surface 135 and a communicating curved concave surface 136 on its extremity, both of which are adapted to cooperate with the roller 130 on the switch lever 129.

Thus when the heating unit 110 and reflector 111 are in the full line position shown in Fig. 21, the switch 128 will be connected and the switch operating cam 134 and roller 130 will be in the dotted line positions shown in Fig. 22, i. e. with the spring 131 then extended and the roller held in spring extending position by the cam surface 136, while current will be supplied to the unit 1. When, however, the unit 110 and reflector 111 are swung toward the right (as is readily accomplished by grasping the handle 115), the parts 134, 130 will assume the full line position shown in Fig. 22. In that position, the circuit to the heater unit 110 will be broken by the spring 131 as soon as the surface 136 has moved sufficiently far to permit the roller to roll out of the notch formed by the surface 136 and along the curved convex surface 135. Further, it will, of course, be clear that the circuit will be broken with a snap action in such manner as to minimize sparking. It will, moreover, also be evident that whenever it is desired to re-establish current flow to the unit 1, all that it is necessary to do is to move the latter reversely by the handle 115, whereupon the cam surface 135 will move along the roller 130, and in so doing, force the latter outward as the spring 131 is tensioned, and automatically cause the roller again to seat in the cam notch 136.

Cooperating with the switch mechanism just described, are also improved connections therefor and improved controlling mechanism therefor carried upon the support C and herein within a suitable chamber 140 within said support. As shown, current is supplied to the support C through a suitable cable comprising conductors 141, 141' connected at the back of the same on the opposite side of the support from the switch actuating roller 130. Further, it will be noted that inside the chamber 140, an insulating base 142 is provided which is in turn connected through suitable conductors 143, 144 with a snap controlling switch 145 carried on the front face of the support C and of well known construction and adapted to be operated by a turn button 146. Attention is further directed to the fact that this switch 145, which is of a well known construction and per se forms no part of the applicant's invention, is connected by conductors 147, 148 to the switch 128, which is in turn connected to conductors 149, 150, which are the conductors leading to the unit 110 through the metal sheath 127 and which unite to form the cable 113 previously described. Thus it will be evident that when snap button 146 has been moved into its position opposite the word "Broiler," (Fig. 25), it will establish circuit connections to the switch 128 which will, in turn, have its circuit made or broken depending upon whether the heating unit 110 is in operative or inoperative position. Moreover, this button 146 also has, in addition to an "off" position, and the "on" position for the unit 110, herein marked "Broiler," an "on" position for a stove carried by the support C and hereinafter described, which position is herein marked "Plate," as well as an "on" position wherein both the element 110 and this stove are connected in series in such manner as to enable food to be kept hot with a minimum use of current, this position herein being marked "2-Low."

Attention is here directed to the stove provided on the support C and adapted to cooperate with the heating unit 110 and also to be controlled by the switch 145. Herein, this stove is in the form of a usual type of electric plate or grid comprising a usual refractory heating unit or disc 151 and connected through terminals 152, to conductors 153, 154, which in turn lead to the switch 145. As shown, the refractory disc 151 is mounted in a suitable depressed chamber 155 in a disc 156 carried on the top surface 157 of the base C. Further, the disc 151 is preferably suitably attached to and supported on the bottom of the chamber 155 by an axial threaded connection 158, with the disc in spaced relation to the bottom of the chamber and also suitably spaced from the sides of the latter. As shown, the chamber bottom is also preferably provided with suitable apertures 159 arranged around the same and with a suitable aperture 160 permitting the leads therefrom to be connected to the terminals 152, which herein are also carried on a depending apron 161 attached to the outer side wall of the chamber 155. As in a preferred construction, this outer side wall of the chamber 155 is also suitably spaced substantially from the edge 162 of the aperture in the top 157 in which the plate supporting member is carried. Here, as illustrated in Figure 23, the portion 156 on the latter member is also spaced above the top 157 and provided with a downturned edge 163 contacting with the surface 157 in such manner as to minimize the amount of heat conduction. As a result of this construction, it will be evident that when the button 146 of the switch 145 is turned toward the word "Plate," current flow will be established from the switch 145 through the conductors 153, 154 and the plate 151 in such manner as to heat the latter, which is accordingly adapted to perform all functions of a stove.

Here attention is directed to the circuit connections illustrated in the diagram comprising Fig. 25. From this, it appears that, in addition to the circuits heretofore described, a pair of pilot lights 164 and 165 is provided. Of these, the light 164 is preferably in the form of a unit having a colored front face and connected and mounted on the front wall of the support B on one side of the switch 145, while the pilot light 165 is a similar unit on the opposite side of that switch. As shown, the unit 164 is connected through suitable leads 166, 167, which are tapped into the same terminals on the switch 145, to which conductors 153, 154 of the stove plate 151 are connected, the same herein being illustrated as connected in parallel across these two conductors. Further, the unit 165 has conductors 170, 171 similarly connected across the conductors 149, 150 which lead to the heating unit 110 from the switch 128. It will accordingly be evident that whenever the switch 128 is in such position that the heating unit 110 is connected, the light 165 will be on, while whenever the plate 151 on the support C is connected, the light 164 will be on, whereas both lights will be off as soon as the circuit connections are broken.

Attention is further directed to the fact that the switch 145 is of such a construction as to connect both the unit 110 and the stove 151 in series for simultaneous operation when desired. Herein, this position is marked "2-Low" and is diametrically opposite the "Broiler" position, this position being provided to permit of keeping food hot at a temperature substantially below the cooking temperature of the unit 110 and stove 151. Moreover, it will be evident that since the lights 164, 165 are connected as described, these will both be on when the heating coils are thus connected and simultaneously in use. It will, of course, be evident that when the switch is thrown to the position marked "Off," all current flow through the same will be interrupted in such manner as not only directly to interrupt the flow to the stove 151, but also to interrupt the flow to switch 128 and thereby render the latter inoperative to supply current to the heating unit 110.

To cooperate with the heating means above described, I also provide modified utensils adapted to be carried on the support C and be heated by the stove 151, or the heating unit 110, or both. Insofar as their broiling and frying surfaces are concerned, these utensils are essentially similar to the receptacle means B, so that a specific description of the same is believed to be unnecessary. It will, however, be understood that they differ from the means B heretofore described by having the broiling and frying surfaces on different receptacle means or units, one of which has a broiling top and the other a frying top while each is equipped with a like generally flat and flanged bottom of such structure as to be adapted to slide over the stove 151 and fit over the latter while its corners also receive and position the receptacle relative to the corner posts on the support C in the same general manner heretofore described.

In use, it will also be evident that the operation of this modified construction will be substantially the same as that heretofore described as regards the searing and cooking effects obtainable and as regards the consumption of cooking gases and the flow of juice out of the path of the reflector during broiling. It will, however, be noted that to effect vertical adjustment, it is necessary to release the set screw 119 and raise the member 113 to the desired vertical position manually and again tighten the set screw. Moreover, with the switch 128 on, to break the circuit of the heating unit 110, it is necessary for the handle 115 to be grasped and the whole unit A to be swung manually to the right. Further, it will be clear that when it is reversely swung, current flow to the unit 110 will be automatically re-established. Through the switch 128, it will also be observed that it is possible for the heating means A or the stove 151 to be used in different relations as previously described, while the pilot lights 164, 165 will also function as previously described.

No claim is made herein to the connector construction per se between the heating unit and the support therefor, this construction being claimed in my copending divisional application Serial No. 226,599, filed August 24, 1938, while no claim is also made herein to the utensil structure, the same being claimed in my copending divisional application Serial No. 226,600, filed August 24, 1938.

While I have in this application specifically described one form of my invention with certain modifications thereof, it will be understood that these forms of the same are chosen for illustration and that the invention may be further modified and embodied in other forms without departing from its spirit or the scope of the appended claims.

What I claim as new and desire to secure by Letters Patent is:

1. In a broiler, a downwardly directed reflector, and electric searing means disposed therein including a hollow and elongated refractory supporting member, a resistance element on the exterior thereof, and a heat distributing baffle plate on the lower end of said member cooperating with said reflector to eliminate hot spots and underlying said lower end.

2. In a broiler, a stand, a downwardly directed reflector disposed symmetrically around a vertical axis, radiant electric searing means disposed coaxially therein including a refractory supporting member, a resistance element on the exterior thereof and a heat distributing plate on the lower end of said member and underlying the latter and cooperating with said reflector to distribute radiant heat substantially uniformly in a horizontal plane below the same, and horizontally disposed food carrying means spaced from the reflector for carrying food horizontally beneath said reflector and searing means.

3. In an electric cooking device, a downwardly disposed reflector, a radiant heating unit disposed therein of sufficient capacity to consume gases rising from articles cooked thereby and disposed beneath said reflector and unit, and means retarding the escape of gases rising from said cooked articles up over said unit and for holding them in the highly heated area within said reflector a sufficient time to effect substantial consumption of said gases by said unit.

4. In an electric cooking device, a downwardly disposed reflector, a radiant heating unit of large capacity disposed therein, means restricting the escape of gases rising from cooked articles up over said unit for effecting substantial consumption of said gases by said unit, and a horizontally disposed food support spaced below said reflector and having means for draining laterally out of the path of heat reflected from said reflector and unit, liquids from horizontally disposed articles on said support.

5. In an electric cooking device, a downwardly directed reflector, electric heating means of high capacity vertically disposed therein, a canopy carrying both of the same disposed above the upper end of said heating means, and means cooperating with said heating means and reflector to consume gases rising from cooked articles up along said heating means to the atmosphere comprising a narrow annular passage from the highly heated area within said reflector into said canopy.

6. In an electric cooking device, a downwardly directed reflector, electric heating means vertically disposed therein of sufficient heating capacity to consume gases rising from articles cooked thereby and disposed beneath said reflector and unit, means cooperating with said heating means and reflector to retard the escape of gases rising from said cooked articles up along said heating means for holding them in the highly heated area within said reflector a sufficient time to permit substantial consumption thereby, a stand carrying said elements, and utensil means on said stand for carrying food horizontally beneath said elements communicating freely laterally with the atmosphere.

7. In an electric cooking device, a downwardly directed reflector communicating with the atmosphere at its point of maximum diameter, a radiant electric heating unit of large capacity vertically disposed therein including a refractory supporting member and a resistance element supported thereon, and heat distributing baffle means on the lower end of said unit underlying the lower end of said member and cooperating therewith and with said reflector to effect substantially uniform distribution of heat below the latter.

8. In an electric cooking device, a downwardly directed reflector, a radiant electric heating unit of large capacity vertically disposed therein, means underlying said unit and cooperating therewith and with said reflector to effect substantially uniform distribution of heat below the latter, and means for retarding the escape of the gases rising from said cooked articles over said unit for holding them in the highly heated area within said reflector a sufficient time to effect substantial consumption of said gases by said unit.

9. In an electric cooking device, a downwardly directed reflector, a radiant electric heating unit of large capacity vertically disposed therein, means cooperating with said unit and said reflector to effect substantially uniform distribution of heat below the latter, means for directing the gases from cooked articles over said unit for substantial consumption thereby, and a horizontally disposed food support having means for draining liquids from cooked articles out of the path of said reflector and unit.

10. In an electric cooking device, a downwardly directed reflector, a radiant electric heating unit of large capacity vertically disposed therein, a canopy carrying said reflector and heating unit, means on said unit cooperating with said reflector to effect substantially uniform distribution of heat below the latter, and air passage means in said canopy around the axis of said unit.

11. In an electric cooking device, a canopy, an insulating base therein carrying hollow tapered circuit terminal sockets, a heating unit carried by said base carrying tapered contact plugs received in said sockets, a downwardly extending reflector carried by said canopy and surrounding said heating unit and having a top opening larger than said heater unit, means for enabling vertical separation of said reflector from said canopy and removal from said device while said heating unit remains in position on the latter and means extending longitudinally of said base and unit and normally holding said plugs in said sockets and releasable to permit vertical separation of said unit from said base.

12. In an electric cooking device, a canopy, an insulating base therein carrying hollow tapered circuit terminal sockets, a depending heating unit carried by said base carrying tapered contact plugs received in said sockets, a downwardly extending reflector carried by said canopy and surrounding said heating unit and having a top opening larger than said element, mechanism for enabling vertical separation of said reflector from said canopy while said heating unit remains in position on the latter comprising means for releasing said reflector from said canopy and means for enabling vertical adjustment of said canopy and means adjustable from outside said canopy and extending longitudinally of said base and unit and normally holding said plugs in said sockets and releasable to permit vertical separation of said unit from said base.

13. In an electric cooking device, a canopy, a depending heating unit therein, and a reflector surrounding said unit and carried in said canopy, said canopy having a series of radially located apertures therein, and said reflector having an aperture therein larger than said heating unit and communicating with said radial apertures.

14. In a broiler, a stand, a broiler unit above the same including a heating unit and a cooperating reflector, and mechanism for adjusting said broiler unit vertically toward and from said stand having adjusting means for said broiler unit including a handle and operative connections movable thereby relative to said unit and having a counter-balancing spring holding said unit in different positions of adjustment.

15. In an electric broiler, a canopy, a reflector connected thereto, a radiant broiler unit in said canopy and insulated therefrom and depending in said reflector, said reflector having restricted air passage means through its top having its entrance above the radiant heated area under said reflector and extending upwardly beneath said canopy and said canopy having air passage means above said reflector communicating with the atmosphere, whereby gases rising from food cooked by said broiler are substantially consumed in the highly heated area beneath said reflector.

16. In an electric broiler, a canopy, a reflector connected thereto, a radiant broiler unit in said canopy and insulated therefrom and depending in said reflector, said reflector having air passage means through its top and said canopy having communicating air passage means above said reflector, and said broiler unit having an insulated support in said canopy depending into the top of said reflector and of smaller diameter than the latter and having said heating unit depending from said support.

17. In a broiler, a reflector casing disposed symmetrically around a vertical axis, a refractory resistance element disposed coaxially therein having a portion of tubular form and having coiled resistance on the exterior thereof and also having on its lower end a heat distributing plate cooperating with said casing to eliminate hot spots and underlying said lower end.

18. In an electric cooking device, a downwardly directed reflector, vertically adjustable electric cooking means disposed therein and operative in widely different vertical cooking positions upon a utensil beneath said reflector, said cooking means and utensil being relatively movable, and controlling switch means for said electric cooking means operable upon relative movement betwen said cooking means and said utensil in any vertical position of said cooking means and while said cooking means remains in any selected position of vertical adjustment.

19. In an electric cooking device, a stand, electric cooking means thereon, utensil means movable into and out of operative position relative to said cooking means, and controlling mechanism for said cooking means including a switch automatically operable as said utensil means is moved relative to said stand, said stand having guiding means thereon and a switch actuating member projecting relative to said guiding means into the path of said utensil means.

20. In an electric cooking device, a stand, electric cooking means thereon, utensil means movable into and out of operative position relative to said cooking means, controlling mechanism for said cooking means automatically operable as said utensil means is moved relative to said stand, and means for at will rendering said controlling means inoperative to permit preheating of said cooking means while said utensil means is removed therefrom, said controlling means including a movable member engageable with said utensil means and said means for rendering said controlling means inoperative including a cooperating latch for said member.

21. In an electric cooking device, a stand, electric cooking means disposed above the same and adjustable vertically into different cooking positions including a downwardly directed reflector and an electric heating unit therein, and circuit controlling mechanism for said heating unit comprising means for effecting swinging of said heating unit laterally into and out of operative position over said stand while maintaining said unit in the same horizontal plane and a switch controlled by operation of said last mentioned means.

22. In an electric cooking device, a stand, a heater carrying unit having a reflector disposed over said stand and pivoted thereon, means for adjusting said unit vertically relative to said stand, and switch mechanism controlling said unit and automatically operable upon movement of the same about its pivot in any vertical position thereof while maintaining said unit in the same vertical position of adjustment.

23. In an electric cooking device, a stand, a heater carrying unit having a reflector disposed over said stand and pivoted thereon, and switch mechanism controlling said unit and automatically operable upon movement of the same about its pivot in either direction comprising a cam movable about the pivot of said unit and switch mechanism actuated by said cam.

24. In an electric cooking device, a stand, a heater carrying unit having a reflector disposed over said stand and pivoted thereon, and switch mechanism controlling said unit and automatically operable upon movement of the same about its pivot including a switch having a spring connected disc and a cam movable with said unit and having cooperating disc actuating and holding surfaces.

25. In an electric cooking device, a stand, a heater carrying unit having a reflector disposed over said stand and pivoted thereon, and switch mechanism controlling said unit and automatically operable upon movement of the same about its pivot including a switch having a spring connected disc, a cam movable with said unit and having cooperating disc actuating and holding surfaces, and abutment means engageable by said cam when said disc engages the positioning surface of the latter.

26. In an electric cooking device, a stand, a heater carrying unit having a reflector disposed over said stand and pivoted thereon, and switch mechanism controlling said unit and automatically operable upon movement of the same about its pivot including a switch having a disc, a cam movable with said unit and having cooperating disc actuating and holding surfaces, and spring means tensioned by said disc as said cam actuates and positions the latter.

27. In an electric cooking device, a stand presenting a utensil support, an upwardly projecting arm thereon carrying a reflector and a broiling unit disposed over said stand, said arm having the conductors for said unit extending therethrough from within said stand and being vertically adjustable relative to said stand and said stand having a cooperating passage through which said arm with the conductors therein is slidable and opening laterally into said stand, and a flexible metal sheath surrounding said conductors in said last mentioned passage and extending through said lateral opening.

28. In combination, a support, a vertically adjustable upstanding tubular arm having a laterally extending portion carrying a depending reflector and broiler unit and having conductors for said broiler unit extending from inside said support up through said arm, a guide on said support in which the lower end of said arm is vertically adjustable, and a flexible metal sheath enclosing the portion of said conductors below the lower end of said tubular arm and movable in said guide therewith.

29. In an electric cooking device, a stand, an electric broiler unit disposed above the same, utensil means on said stand beneath said unit, means for automatically controlling the circuit of said broiler unit upon movement of said utensil means, a main switch, and indicator means operative only when said utensil means is in operative position.

FRANK E. WOLCOTT.